United States Patent [19]
Yanai et al.

[11] Patent Number: 5,666,210
[45] Date of Patent: Sep. 9, 1997

[54] DOCUMENT COMMUNICATION APPARATUS AND DOCUMENT COMMUNICATION SYSTEM

[75] Inventors: Norifumi Yanai, Ibaraki-ken; Kouzou Nakamura, Hitachiota; Mariko Okude; Shigemasa Shiota, both of Hitachi, all of Japan

[73] Assignee: Hitachi, Ltd., Tokyo, Japan

[21] Appl. No.: 253,258

[22] Filed: Jun. 2, 1994

[30]  Foreign Application Priority Data

Jun. 3, 1993 [JP] Japan ................... 5-133372
Jun. 11, 1993 [JP] Japan ................... 5-140408

[51] Int. Cl.⁶ ............................................ H04N 1/00
[52] U.S. Cl. ................... 358/402; 358/405; 358/407; 358/434; 358/444; 358/448; 358/468
[58] Field of Search ............... 358/438, 434, 358/468, 435, 439, 436, 440, 448, 402, 400, 407, 405, 426, 401, 427, 404, 444, 450; 379/100; 395/114, 115

[56]  References Cited

U.S. PATENT DOCUMENTS

| | | | |
|---|---|---|---|
| 4,769,719 | 9/1988 | Endo | 358/439 |
| 4,939,767 | 7/1990 | Saito | 358/438 |
| 4,994,926 | 2/1991 | Gordon et al. | 358/407 |
| 5,041,915 | 8/1991 | Hirota et al. | 358/438 |
| 5,121,221 | 6/1992 | Hamano et al. | 358/426 |
| 5,130,806 | 7/1992 | Reed et al. | 358/438 |
| 5,283,665 | 2/1994 | Ogata | 358/405 |
| 5,327,526 | 7/1994 | Nomura et al. | 395/115 |
| 5,367,564 | 11/1994 | Sutoh et al. | 358/402 |
| 5,377,017 | 12/1994 | Lam | 358/435 |
| 5,414,528 | 5/1995 | Hatamura | 358/435 |
| 5,438,433 | 8/1995 | Reifman et al. | 358/468 |
| 5,555,361 | 9/1996 | Narita et al. | 395/144 |

FOREIGN PATENT DOCUMENTS 60-65665  4/1985  Japan ............................ 358/438

*Primary Examiner*—Kim Vu
*Assistant Examiner*—Fan Lee
*Attorney, Agent, or Firm*—Antonelli, Terry, Stout & Kraus, LLP

[57]  ABSTRACT

A document communication apparatus includes an input unit for giving various indications such as document processing; a communication unit for transmitting and receiving information and rules of document processing in communication with another document communication apparatus, and an information processing unit for processing document information based on the received rules of document process Further, a communication apparatus for transmitting or receiving information among plural communication apparatuses makes it possible to transmit and receive a document with the rules of document processing corresponding to the content of at least a request for document processing. The communication apparatus includes a storing unit for storing a document profile containing the rules of document processing transmitted from a transmitting apparatus, a storing unit for storing rules of document processing received from a receiving apparatus, a document processing unit for collating a document profile read from the document profile storing unit to rules of document processing read out of the storing unit and for executing the predetermined document processing based on the identified result, a document data storing unit for storing document data transmitted from the transmitting apparatus, an input unit for inputting the document processing information of the receiving apparatus, and a display unit for displaying document data, the document profile, the rules of document processing of the receiving apparatus, and the document-processed result.

13 Claims, 18 Drawing Sheets

DOCUMENT COMMUNICATION APPARATUS AND DOCUMENT COMMUNICATION SYSTEM

BACKGROUND OF THE INVENTION

The present invention relates to a document communication apparatus, such as a facsimile or an electronic mail device, which operates to send and receive document data through a communication medium, like an ISDN (Integrated Services Digital Networks), a public line of telecommunication, a radio channel or an office network (local area network; LAN).

In this type of document communication apparatus, for example, in a facsimile apparatus, there has been conventionally provided means for transmitting and receiving identification data for the other station composed of a phone number or a company name in the protocol of establishing the connection and means for displaying the identification data on a display or printing the identification data at the same time as outputting the document data, as a service for the users.

On the other hand, as disclosed in Thomas W. Malone et al.:Intelligent Information—Sharing Systems: Communications of the ACM. Vol. 30, No. 5, pp. 390–402 (May 1987), in electronic mail, there have been provided means for transmitting and receiving document data together with identification data or a document profile composed of a sender's name, a document title, the rank of an emergency or the like and means for displaying the identification data or document profile on a display. These days, since a computer or a modem is sold at a quite affordable price, a user may easily arrange such a communication apparatus by connecting his or her own computer to a LAN or a modem. Therefore, an increasing number of users have come to use electronic mail.

The primary goal which each of the service means as described above commonly has is to make it possible to ascertain a destination station to or from which data is to be transmitted or received. On the other hand, there also is a method for using the identification data for other purposes than ascertaining the destination station, such as calling a phone number of a destination station by using stored identification data, and displaying a list of documents received in which the documents received are sorted based on the identification data.

On the other hand, in a transmitted document, an operator on the side of the transmitting station may write a note on the document regarding a request for a document processing rule, that is, whether the document needs answer, whether it is to be treated urgently or whether it is to be treated as a classified document before transmitting the document data. In such case, an operator at the receiving station is required to actually read the document by displaying or printing each received document for executing the process requested by the transmitting station, and it is completely left to the receiver to read the document processing rule written on the document and determine how to process the document.

The apparatus as disclosed in JP-A-4-294655 is arranged to prepare a table for registering a processing level of transmitted electronic mail in a receiving side terminal so that the transmitting station may refer to the content of the table. Hence, if the processing is standing unsettled, the transmitting station can press the receiving station to advance the processing. Though the sender can press the receiver for the processing, how to process thereafter is carried out is left to the user.

As a system for transmitting a document profile according to a facsimile (communication) protocol, there are provided two systems, one for using the phase B which is slow, but far less erroneous, and the other for using the phase C as disclosed in JP-A-1-151874.

SUMMARY OF THE INVENTION

A document communication system for transmitting document data by electronic mail together with its document profile is disadvantageous in that the receiver sometimes does not process the document according to the sender's will. For example, even if a high rank of emergency is assigned, whether or not the document is processed urgently is left to the receiver's will, if he or she reads the document profile.

On the other hand, consider the receiving station. The conventional communication apparatus is arranged so that an operator of the receiving station can not execute the processing requested by the transmitting station without having to actually read the document using a method for displaying or printing each received document. If a lot of documents containing a request for an answer with a deadline are transmitted, whether or not any one of the documents has a term for responding is not allowed to be immediately recognized. Hence, disadvantageously, the document may not be processed in time for the given term.

As a remedy for this disadvantage, it is possible to add to the identification data a request for returning comments or a request for document processing like a rank of emergency or a term (hereafter, described as rules of document processing) before transmitting the identification data. In the receiving station, when the rules of document processing are transmitted as identification data, the list of the received documents is displayed. At such time, the rules of document processing such as a request for an answer or a rank of emergency, are identified when it is displayed. Hence, the operator can process the document according to the request for document processing without having to read the document.

The foregoing rules of document processing, however, are arbitrarily given by a transmitting station without having to consider any condition of an operator of a receiving station. Hence, around the end of a term, for example, two or more documents with the same deadline may be waiting to be processed in the receiving station. In this case, the operator has to determine the order of processing the received documents based on the document profile, such as a transmitting station of the received document or a document title, and execute the document processing in the determined order. For example, the operator of the receiving station is required to make a decision regarding, for example, what is to be the most important document to be processed in precedence over the other documents, each having the same deadline.

It is, therefore, necessary to provide an environment where an operator of the receiving station does not waste time in determining the order of processing the received documents, so that the operator may smoothly execute the main service of the document processing.

Further, it is also necessary to take measures if an urgent document is received or if the day represents the deadline of a document in the absence of an operator on the receiving station.

It is a first object of the present invention to provide a document communication apparatus which is arranged so that a sender may specify rules of document processing to be executed on the receiving side and realize flexible expansion of document processing.

It is a second object of the present invention to provide a document communication apparatus which can specify rules of document processing in the protocol according to the transmission protocol of a G3 Facsimile.

It is a third object of the present invention to provide a document communication apparatus and a document communication system which can provide assistance to the document processing of the operator of the receiving station so that a smooth answer may be processed concerning a document having a certain rank of emergency or having a deadline.

According to an aspect of the present invention, a document communication apparatus includes input means for giving various indications, such as document processing, communication means for transmitting document information and rules of document processing or for receiving the document information and the rules of document processing transmitted by another document terminal, and information processing means for processing the document information based on the rules of document processing received by the communication means.

According to a preferred embodiment of the present invention, the rules of document processing received by the communication means are rules of document sorting. The information processing means operates to execute the sorting process of the document information according to the protocol indicated by the sorting information.

According to another preferred embodiment of the present invention, the rules of document processing received by the communication means are rules for returning an answer that shows that the document was opened. The information processing means operates to return the answer that shows that the document was opened according to the protocol indicated by the answer that shows the document was opened.

According to another preferred embodiment of the present invention, the rules of document processing received by the communication means are rules for returning comments. The information processing means operates to return the document information with a comment according to the protocol indicated by the rules for returning comments.

According to another preferred embodiment of the present invention, the rules of document processing received by the communication means are rules for circulating documents. The information processing means operates to return the document information with a comment to another document communication terminal to which the document is to be circulated according to the protocol indicated in the rules for circulating documents.

According to another preferred embodiment of the present invention, the information processing means indicates the communication means in a manner to send the code data of the rules of document processing as FAX image data.

According to another preferred embodiment of the present invention, the information processing means operates to decode the received FAX image data as rules of document processing and determine whether or not the rules of document processing are added to the image information based on the decoded result.

According to another preferred embodiment of the present invention, the information processing means operates to determine whether or not a destination document communication terminal is the type of terminal that can receive the rules of document processing. If the destination terminal is a terminal that can not receive the rules of document processing, the information processing means operates to expand the rules of document processing to the image information and control the communication means in a manner to send the image information as document information.

The receiving side terminal operates to separate the rules of document processing and the image information from a series of transfer data. Irrespective of whether or not the receiving user gives an answer, the receiving side terminal executes the document processing information in sequence so as to execute the content specified by the transmitting station.

In case of using a facsimile protocol for transmission of a series of transfer data, the receiving side terminal operates to separate the rules of document processing and the image information by using any one of the two systems indicated below. According to the first system, the processing signals NSF and NSS of the phase B of the G3 facsimile are used for determining whether or not a rule of document processing is contained in the transfer data of the phase C. According to the second system, depending on whether or not the processing of the image-expanded transfer data of the phase C is properly terminated, it is determined whether or not a rule of document processing is contained in the transfer data of the phase C.

According to another aspect of the present invention, a document communication apparatus is arranged to transmit and receive information among plural stations, each station being a communication apparatus capable of transmitting and receiving the document together with the rules of document processing having at least a request for document processing. The communication apparatus includes means for storing a document profile containing the rules of document processing transmitted from a transmitting station, means for storing the rules of document processing inputted by the receiving station, means for collating the document profile read from the document profile storing means with the document processing information read from the document processing information storage means and executing a predetermined document process based on the identified result, means for storing the document data transmitted from the transmitting station, input means for inputting document processing information of the receiving station, and display means for displaying the document data, the document profile, the rules of document processing of the receiving station, and the document processed result.

According to another preferred embodiment of the present invention, the document processing means operates to allocate a priority to each received document in accordance with which the document is to be processed in the receiving station.

According to another preferred embodiment of the present invention, the document processing means operates to execute sorting of the receiving documents based on the transmitted document profile and the processing information of the receiving station.

According to a preferred embodiment of the present invention, the communication apparatus includes means for managing a schedule of an operator of the receiving station.

In the document communication apparatus arranged as described above, an operator of the receiving station pre-registers a sender of the document to be processed in precedence over others, a group name, a keyword, and a processing method during his or her absence, as the rules of document processing of the receiving station.

At a time when the document is received from the transmitting station, the document processing means operates to classify (presence/absence of an answer request or the like) the received document based on the identified result of the rules of document processing of the transmitting station by the identifying means of this apparatus.

Further, the document processing means operates to refer to the rules of document processing of the transmitting station and the pre-registered rules of document processing of the receiving station for updating the processing sequence of the document for a document with an answer request. If any measure against the absence of the receiver is registered, the processing, such as notifying of the absence, is executed according to the registered content.

DESCRIPTION OF THE PREFERRED EMBODIMENTS

Hereafter, an embodiment of the present invention will be described with reference to the drawings.

Figure 7:
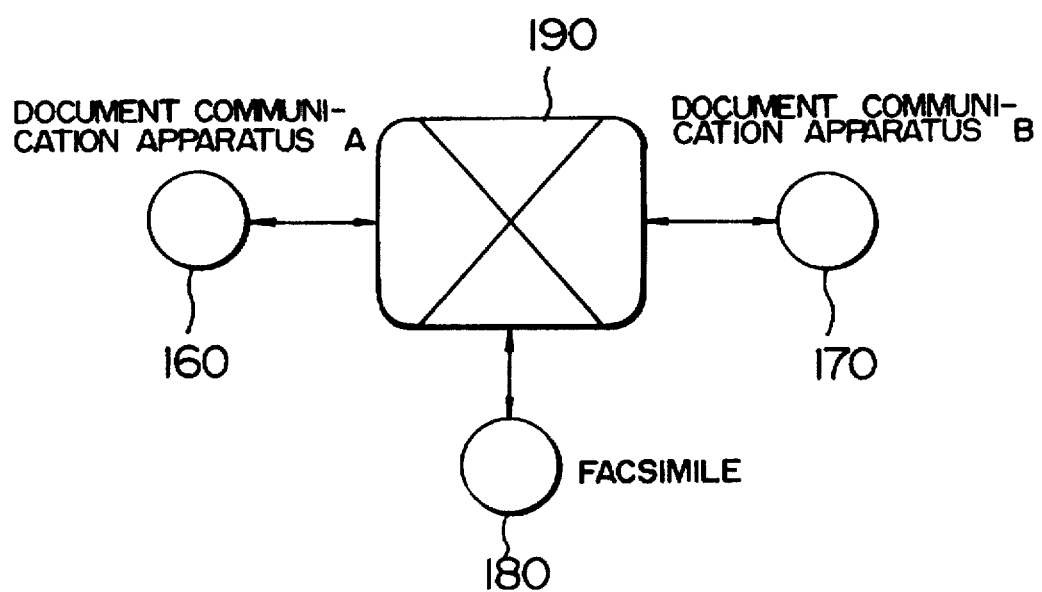
FIG. 7 is a diagram showing an overall arrangement of a document communication system arranged to use a document communication apparatus according to the present invention.

FIG. 7 shows an overall arrangement of a document communication system including a document communication apparatus according to the present invention. In the figure, numerals 160 and 170 denote document communication apparatuses A and B, respectively, according to the present invention. A numeral 180 denotes a conventional facsimile machine. A numeral 190 denotes a communication network.

Figure 8:
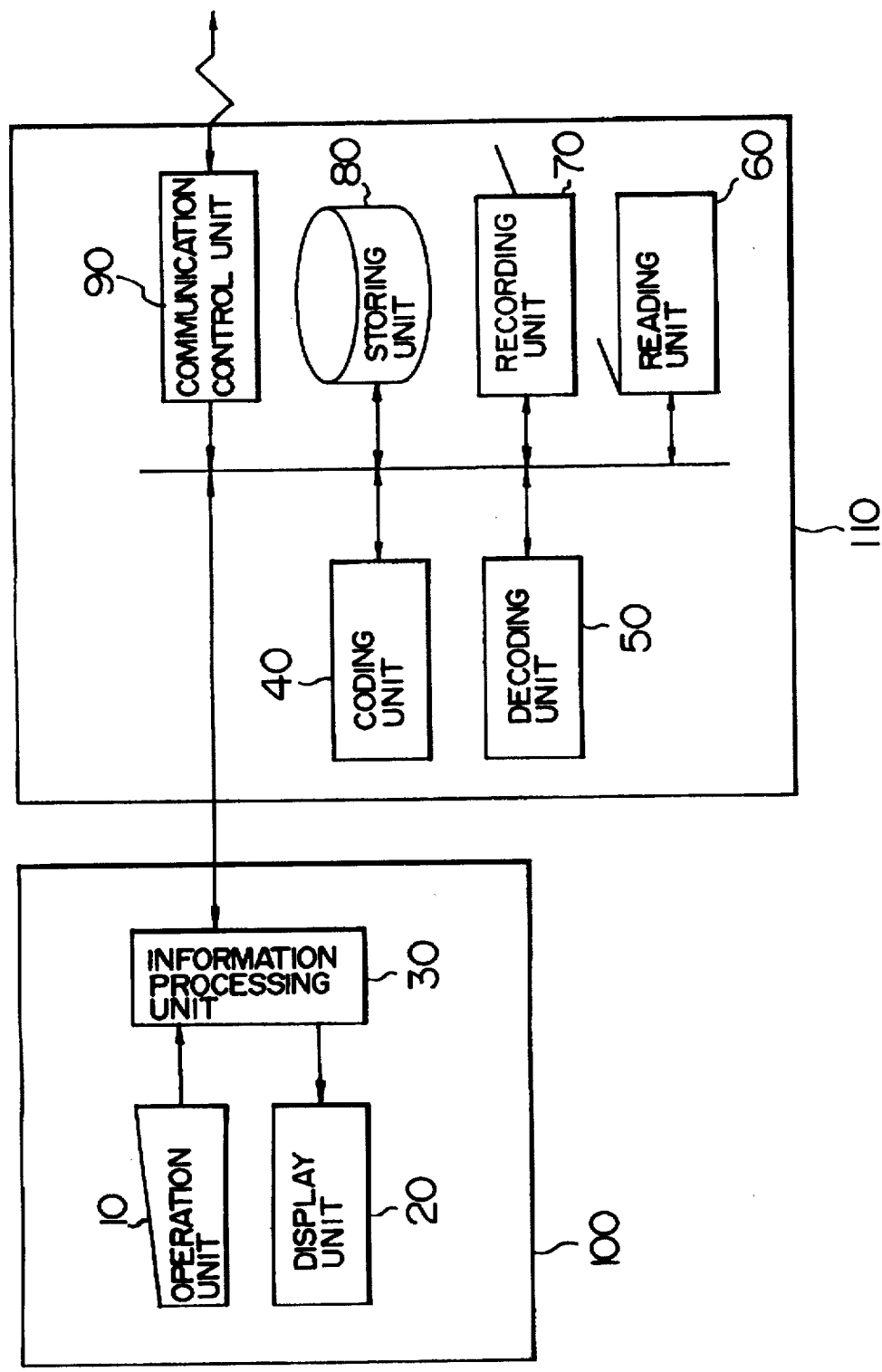
FIG. 8 is a diagram showing an example of a document communication apparatus according to the present invention.

FIG. 8 shows an arrangement of a document communication apparatus according to an embodiment of the present invention. In the figure, a numeral 10 denotes an operation unit composed of input units, such as a keyboard and a mouse, which is used for specifying the rules of document processing.

A numeral 20 denotes a display unit composed of an output unit like a liquid crystal panel, which operates to output image information, rules of document processing, and a document processing condition.

A numeral 30 denotes an information processing unit composed of an information processing processor like a microcomputer, which operates to receive image information and rules of document processing, output a series of transfer data and, conversely, receive a series of transfer data, decompose the received data into image information and document processing information, and output the decomposed information.

A numeral 40 denotes a coding unit, which operates to compress and code the input pixel signal and output the coded image information. As a coding system, for example, a MH (Modified Huffman) code may be used. A numeral 50 denotes a decoding unit, which reads the compressed image information and expands it to an original pixel signal. A numeral 60 denotes a reading unit, which operates to read a manuscript using an imaging device like a CCD (Charge Coupled Device) and output the pixel signal according to the read data.

A numeral 70 denotes a recording unit, which operates to read the pixel signal and print it on a recording sheet. A numeral 80 denotes a storing unit, which operates to store the pixel signal, the image information and the rules of document processing, which constitute the contents of the received document. A numeral 90 denotes a communication control unit, which is composed of a microcomputer and a modem and executes some processings such as transmitting or receiving a series of transfer data and a controlling operation for repeating a request by error detection. Further, the operation unit 10, the display unit 20 and the information processing unit 30 compose a personal computer 100. On the other hand, the coding unit 40, the decoding unit 50, the reading unit 60, the recording unit 70, the storing unit 80, and the communication control unit 90 compose a transmitting and receiving adapter device 110.

Figure 1:
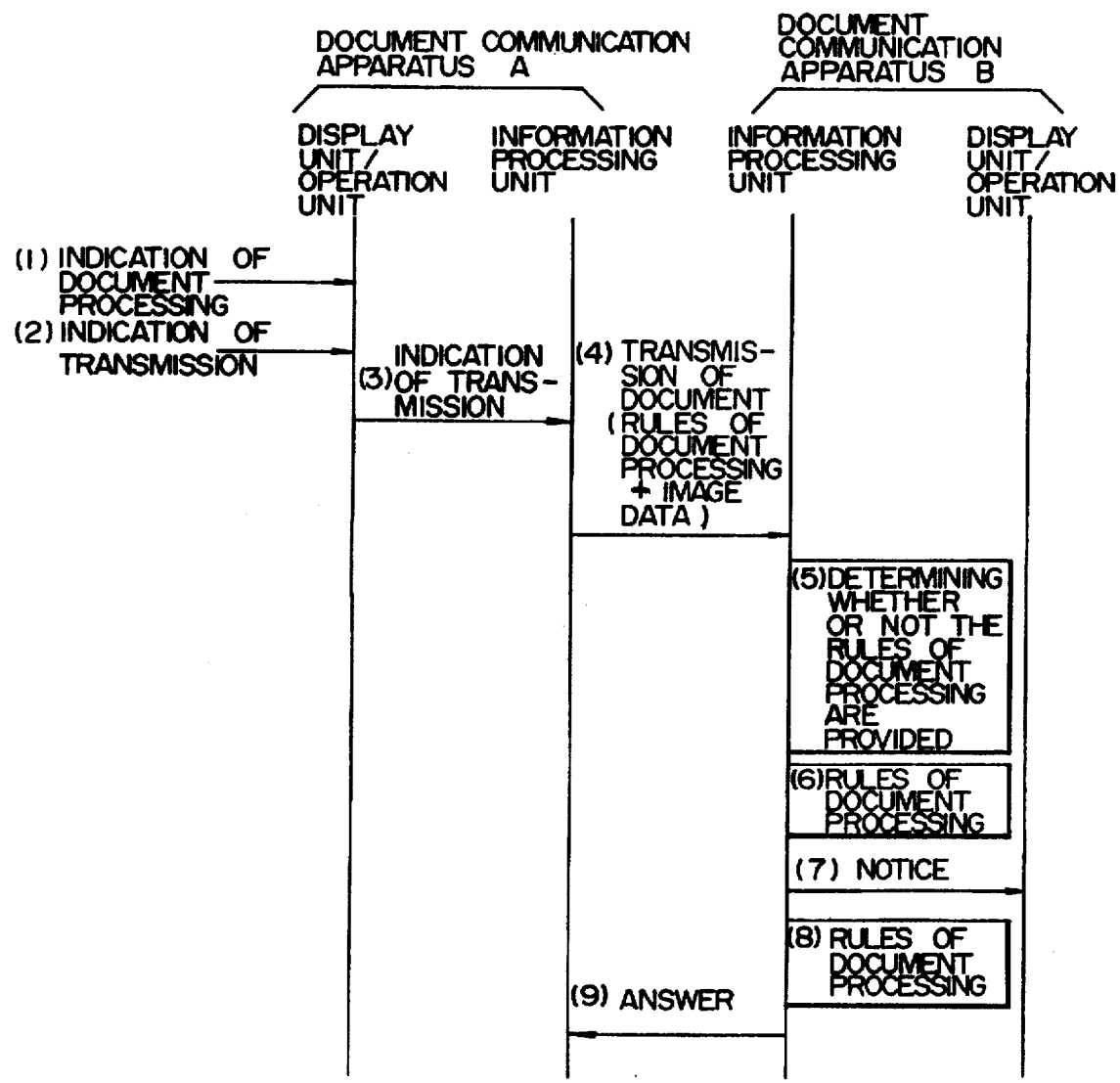
FIG. 1 is a sequence diagram showing an example of document communication procedure executed by a document communication apparatus according to the present invention.

FIG. 1 shows an example of a document processing procedure to be executed by the document communication apparatus according to the present invention.

In the figure, a user of a document communication apparatus A located on the side of transmitting a document specifies rules of document processing to the display unit and the operation unit at the process (1) and indicates that the document is to be sent at the process (2). The information processing unit operates to receive a transmitting indication at the process (3) and to send a document, that is, the specified rules of document processing and the previously prepared image data, as a series of transfer data to the document communication apparatus s for receiving the document at the process (4).

In response, the information processing unit provided in the document communication apparatus B operates to determine whether or not the rules of document processing are given at the process (5).

In this embodiment, since two pairs of rules of document processing are transmitted, the document processings corresponding to the processes (6) and (8) are executed. The process (6) happens to be a rule of document processing for giving a notice to the display unit. Hence, the processed result is indicated at the process (7).

The process (8) happens to be a rule of document processing for giving an answer to the document transmitting side. Hence, the result is given back in the process (9). The replied content may have the transmitted image data together with comments added by the receiver or one of the documents received by the receiving terminal (apparatus), as specified by the transmitting terminal.

As mentioned above, the rules of document processing to be executed at the receiving side can be specified from the transmitting side and at the time an indication may be changed to specify a different content each time a document is transmitted. In this embodiment, the document processing is executed in the sequence of the processes (6), (7), (8) and (9). Instead, for example, the sequence may be changed to the processes (8), (9), (6) and (7).

Figure 2:
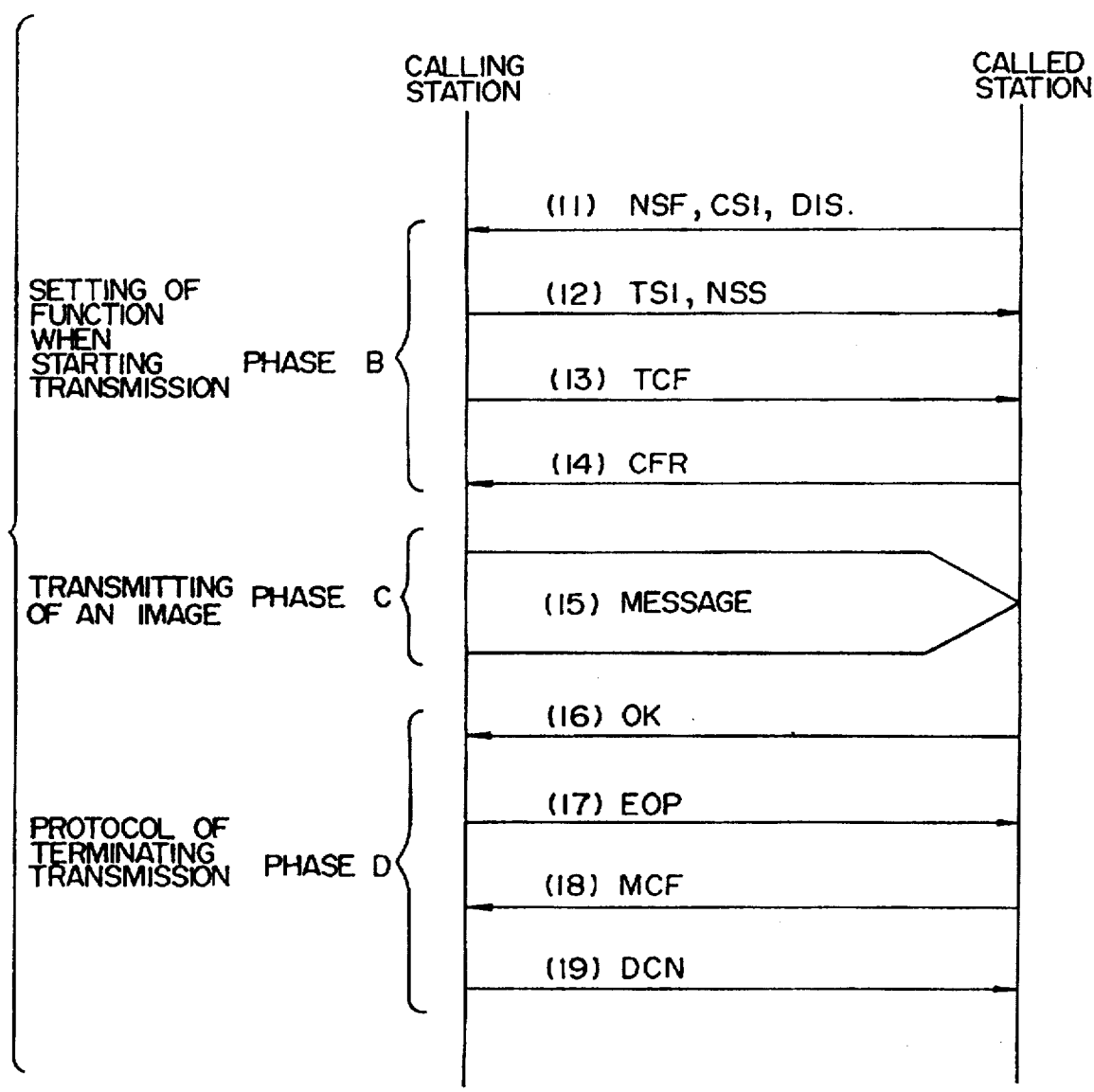
FIG. 2 is a sequence diagram showing a facsimile protocol used for document communication procedure executed by the document communication apparatus according to the present invention.

FIG. 2 shows another example of document communication processing executed by the document communication apparatus according to the present invention, for which a facsimile protocol is used.

In this embodiment, as a method of giving to the called station an indication that the message transferred in the phase C of the facsimile protocol takes the form of a series of transfer data, at least two methods are available. One method uses a process of the phase B, which will be included in the description below. The other method is a method for adding information which is undecodable to the form of a series of transfer data, which will be described later with reference to FIG. 4.

The calling station confirms that the called station has a capability of receiving a series of transfer data at the process (11) of the phase B and a capability of repeating a request by error detection in the phase C (message transfer). At the process (12), the calling station indicates to the called station that the message to be transferred takes the form of a series of transfer data and is repetitively transmitted by error detection. Then, through the message (15), the series of transfer data is transmitted.

The called station notifies the calling station of whether or not an error takes place at the process (16). If an error is found, the called station also notifies the calling station of the block of the message (15) in which the error was found. If an error has been found, the calling station operates to re-transmit the block. This embodiment concerns the case where no error is found. Then, the phase D (post-message protocol) is executed and the transfer is terminated.

Figure 3:
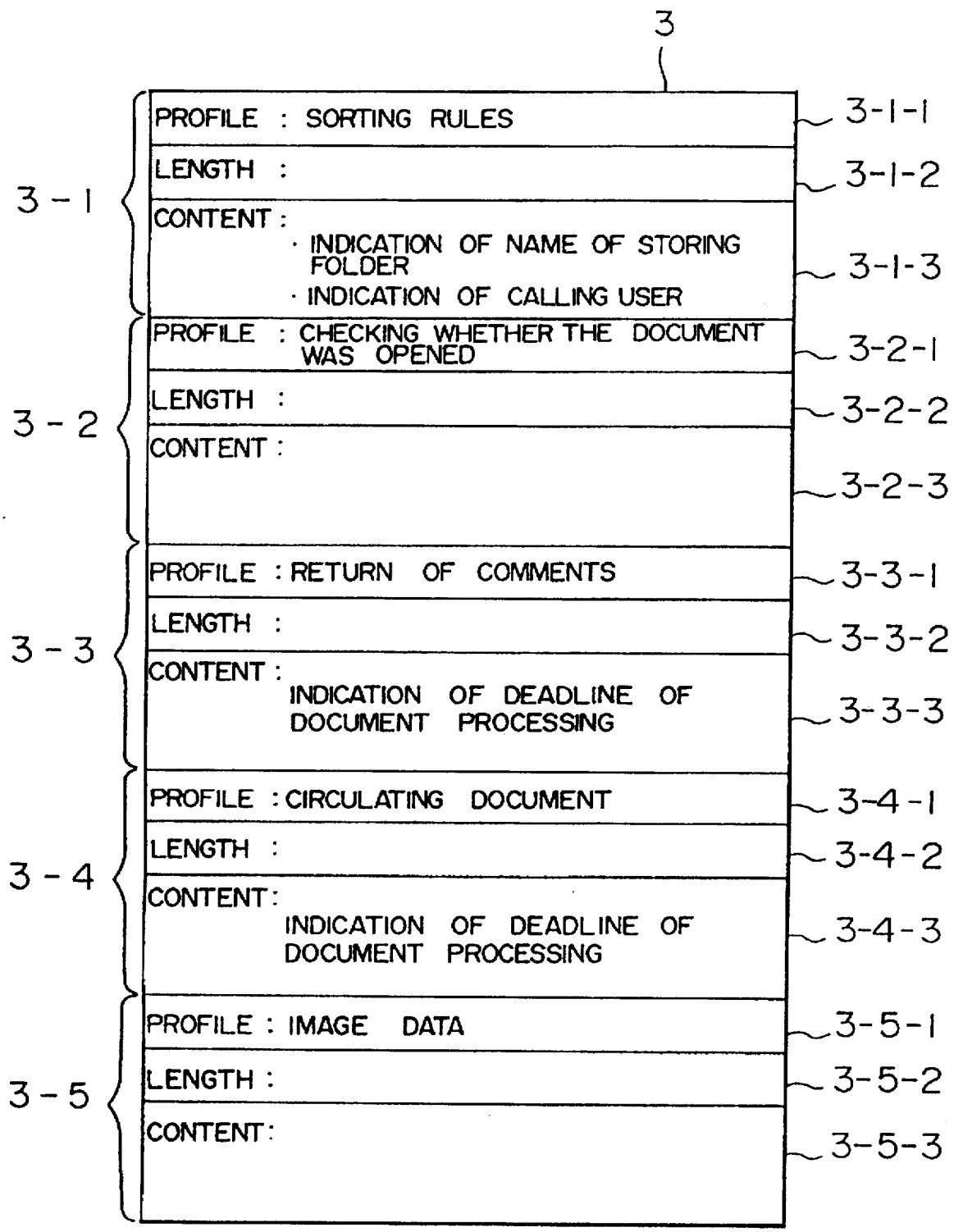
FIG. 3 is a diagram showing an example of a series of data in the phase C transmitted by the document communication apparatus according to the present invention.

FIG. 3 shows an embodiment of a series of transfer data in the phase C to be transmitted in accordance with the present invention.

In FIG. 3, a numeral 3 denotes all the transfer data in the phase C. Numerals 3-1, 3-2, 3-3, 3-4 and 3-5 denote first, second, third, fourth and fifth serial transfer data items, respectively.

A numeral 3-1-1 denotes a first transfer data item profile. It indicates a rule of document sorting which is a part of the rules of document processing in this embodiment. A numeral 3-1-2 denotes the length of the first transfer data item, based on which of the range of the content of the first transfer data item and the starting location of the second transfer data item can be identified. A numeral 3-1-3 denotes a rule of document sorting, which is represented by character codes, for example, in order that the content may be processed. The content indicated by the numeral 3-1-3 is composed of the indication of a name of a folder for storing a document and an indication of giving an alarm to the user, for example. A numeral 3-2-1 indicates that the second transfer data item profile is a rule of checking an answer that shows a document was opened, which is a part of the rules of document processing. A numeral 3-2-2 denotes the length of the second transfer data item. A numeral 3-2-3 denotes the content of the second transfer data item. A numeral 3-3-1 indicates that the third transfer data item profile is a rule of returning comments, which is a part of the rules of document processing. A numeral 3-3-2 denotes the length of the third transfer data item. A numeral 3-3-3 denotes the content of the third transfer data item. The content indicated by the numeral 3-3-3 is composed of an indication of a deadline of document processing. A numeral 3-4-1 indicates that the fourth transfer data item is a rule for circulating documents, which is a part of the rules of document processing. A numeral 3-4-2 denotes the length of the fourth transfer data item. A numeral 3-4-3 denotes the content of the fourth transfer data item. The content indicated by the numeral 3-4-3 is composed of an indication of a deadline of document processing, for example.

A numeral 3-5-1 indicates that the fifth transfer data item profile is image data. A numeral 3-5-2 denotes the length of the fifth transfer data item. A numeral 3-5-3 denotes the content of the fifth transfer data item. The content indicated by the numeral 3-5-3 can be identified as the image data from the data 3-5-1 indicating the profile of the content indicated by the numeral 3-5-3. Hence, the receiving terminal can decode the image data into original image data and record the decoded data. This makes it possible for a user to easily know which of the documents is directed by the indication of the name of the document storing folder, the indication of giving an alarm to the user, and the indication of a deadline for document processing, which are given by the first, the second, the third and the fourth transfer data items, to an advantage.

The content of processing specified by the rules of document processing also is capable of setting its sequence. For example, assuming that the first, the second, the third and the fourth transfer data items 3-1, 3-2, 3-3 and 3-4 are processed in this sequence from the beginning, the processing sequence can be changed by replacing the contents of the series of transfer data items 3-1, 3-2, 3-3 and 3-4. Regarding the contents 3-1-3, 3-2-3, 3-3-3 and 3-4-3, the processing sequence in the series of transfer data items can be changed by changing the sequence of each processing item.

As another method for indicating a sequence, the processing sequence may be given as a number to each processing item.

Now, description will be directed to a method of processing a document by using the contents of the series of transfer data items. The indication of a name of a folder for storing a document, which corresponds to the item 3-1-3, will be described with reference to FIG. 5. Likewise, the indication of calling a user or giving an alarm to a user, which corresponds to the item 3-1-3, will be described with reference to FIG. 6. The method of processing a document by using the indication of a deadline for document processing, which corresponds to the items 3-3-3 and 3-4-3, will be described with reference to FIG. 1. Now, the description will be directed to how the processing is executed if the deadline is indicated to the document processing at the process (8). The indication of the deadline of document processing corresponds to the item 3-3-3 of the rules for returning comments.

The normal processing takes the steps of notifying a receiving user of returning comments and then giving an answer to the comments, terminating the processing. If, however, no answer to the command is transmitted until the deadline indicated by the transmitting side, the answer given at the process (9) indicates the forcible processing of answering the comments. Whether or not the above processing is executed is determined for each document by changing the item 3-3-3.

Next, the description will be directed to how the processing is executed if a deadline is indicated for the process (8) in the rules of document processing. The indication of a deadline corresponds to the item of the numeral 3-4-3 contained in the rule for circulating documents. The normal processing takes the steps of notifying the receiving user of the processing of a document to be circulated and transmitting the document to be circulated to the next user, terminating the processing. If, however, no document to be circulated is transmitted when the time reaches the indicated deadline, in the answer at the process (9), the document to be circulated is forcibly transferred. In this case, the document is transmitted not to the sender shown but to the next user.

Figure 4:
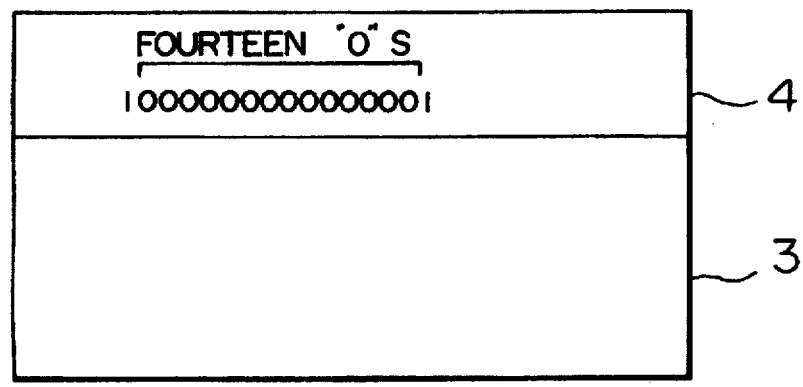
FIG. 4 is a diagram showing an example of the content of a series of data in the phase C having the information for determining whether or not a rule of document processing is present.

FIG. 4 shows an embodiment of a series of transfer data in the phase C, which includes information for determining whether or not the rules of document processing are provided. A numeral 3 denotes the overall transfer data in the phase C as shown in FIG. 3. A numeral 4 denotes transfer data in which a decoding error takes place in the facsimile decoding. For example, when the shown data is decoded, an error takes place in which the number of pixels per one line is short or not sufficient. If this error takes place, it is determined that the rules of document processing are provided. By virtue of such, without having to determine whether or not the rules of document processing are provided at the same time as transferring the series of transfer data, as described with reference to FIG. 2, it is possible to determine whether or not the rules of document processing are provided from the content of the series of transfer data at any time, to an advantage.

Figure 5:
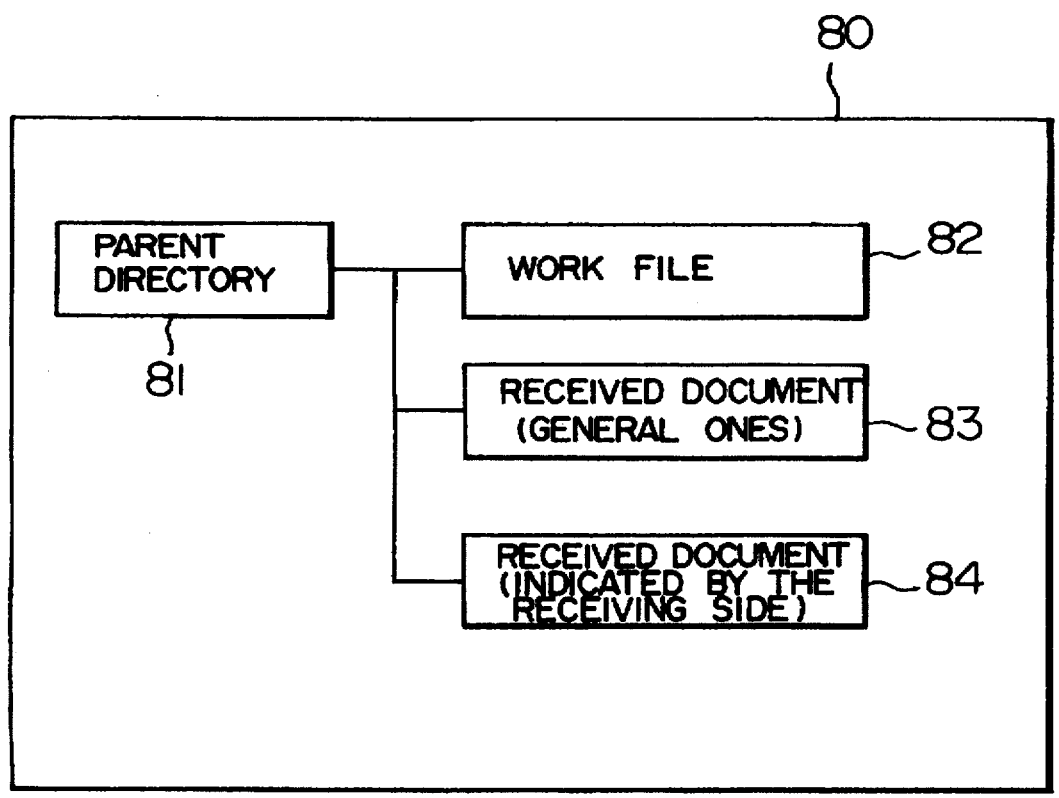
FIG. 5 is a diagram showing a function of a storing unit shown in FIG. 8.

FIG. 5 is an explanatory diagram showing a method for storing a received document. In the figure, a numeral 80 denotes a storing unit. A numeral 81 denotes a parent directory of folders to be described below. A numeral 82 denotes a folder for storing a work file to be used in a wordprocessor or the like. A numeral 83 denotes a folder for storing a general received document. A numeral 84 denotes a folder which can be specified as a storage for a document by a transmitting side. If the item 3-1-3 contained in the received series of transfer data items includes information on an indication of the name of a storing folder, the name of the folder 84 where the document is to be stored is included in the information. If the folder 84 is to be set before transmitting the document, it is necessary that the transmitting side and the receiving side determine the name of the folder. Further, if the folder 84 is set after transmitting the document, a new folder 84 having a folder name contained in the content 3-1-3 is created for storing the received document.

Figure 6:
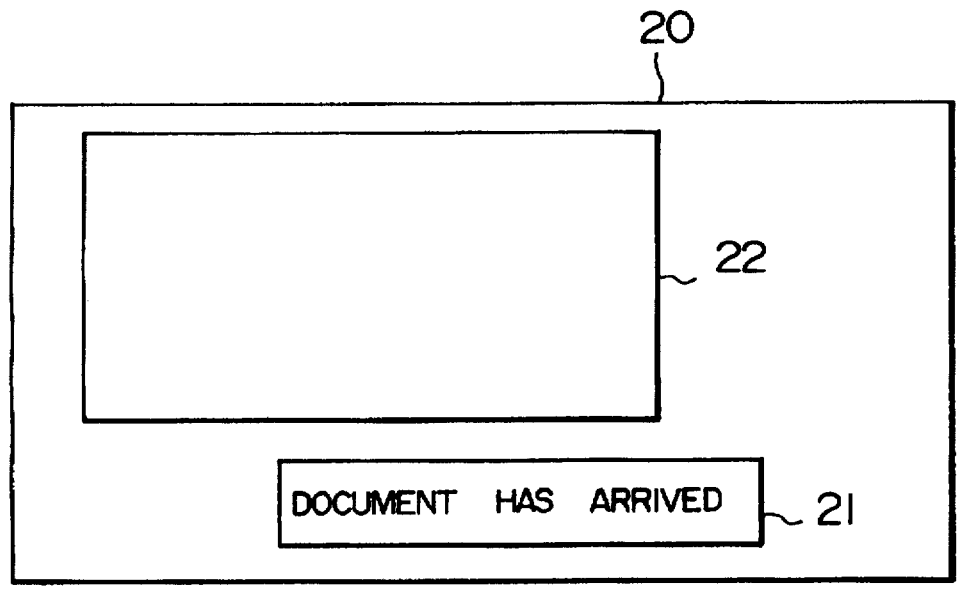
FIG. 6 is a diagram showing an operating example of a display unit shown in FIG. 8.

FIG. 6 is an explanatory diagram showing a method for indicating arrival of a document. In the figure, a numeral 20 denotes a display unit. A numeral 21 denotes an arrival message. A numeral 22 denotes a work window. If the indication of giving an alarm to a user is contained in the item 3-1-3, the arrival message 21 is displayed. If the user does not allow the arrival message 21 to be displayed, the message 21 can be forcibly displayed in response to the request given by the sender, which is a feature of the embodiment.

Figure 9:
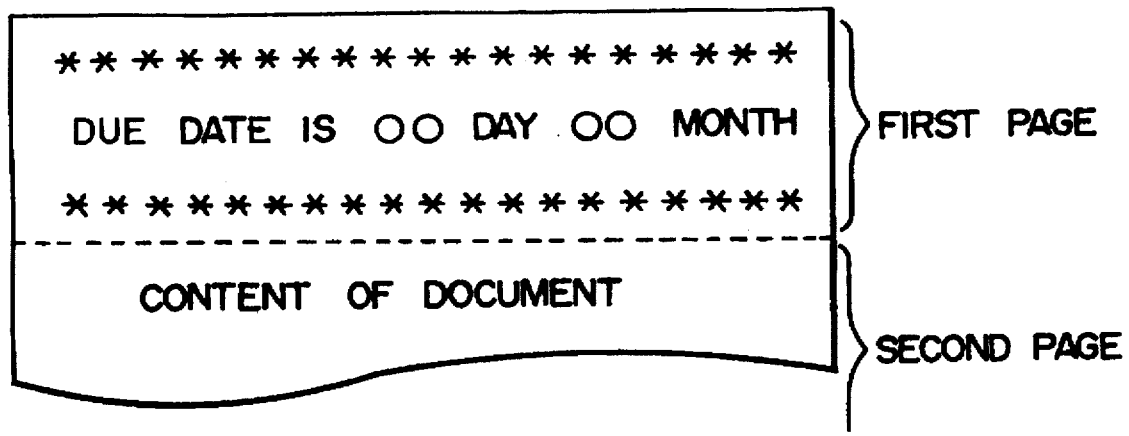
FIG. 9 is a diagram showing image information to be transmitted to a conventional facsimile machine.

FIG. 9 is an explanatory diagram showing image data to be transmitted to a conventional facsimile. In the figure, the first page indicates the image data corresponding to the expanded rules of document processing. The second or later page indicates the image data corresponding to the content of the document. At the process (11) shown in FIG. 2, it is possible to determine if the destination apparatus is the document communication apparatus according to the embodiment or a conventional facsimile.

If the destination apparatus is not the document communication apparatus according to this embodiment, the rules of document processing are expanded to the image data. The expanded image data is added to the content of the document when it is transmitted. The conventional facsimile does not have means for processing the rules of document processing. However, even if the receiving terminal is a facsimile, the image data formed by expanding the rules of document processing is received and then printed for informing the user of the rules of document processing.

Figure 10:
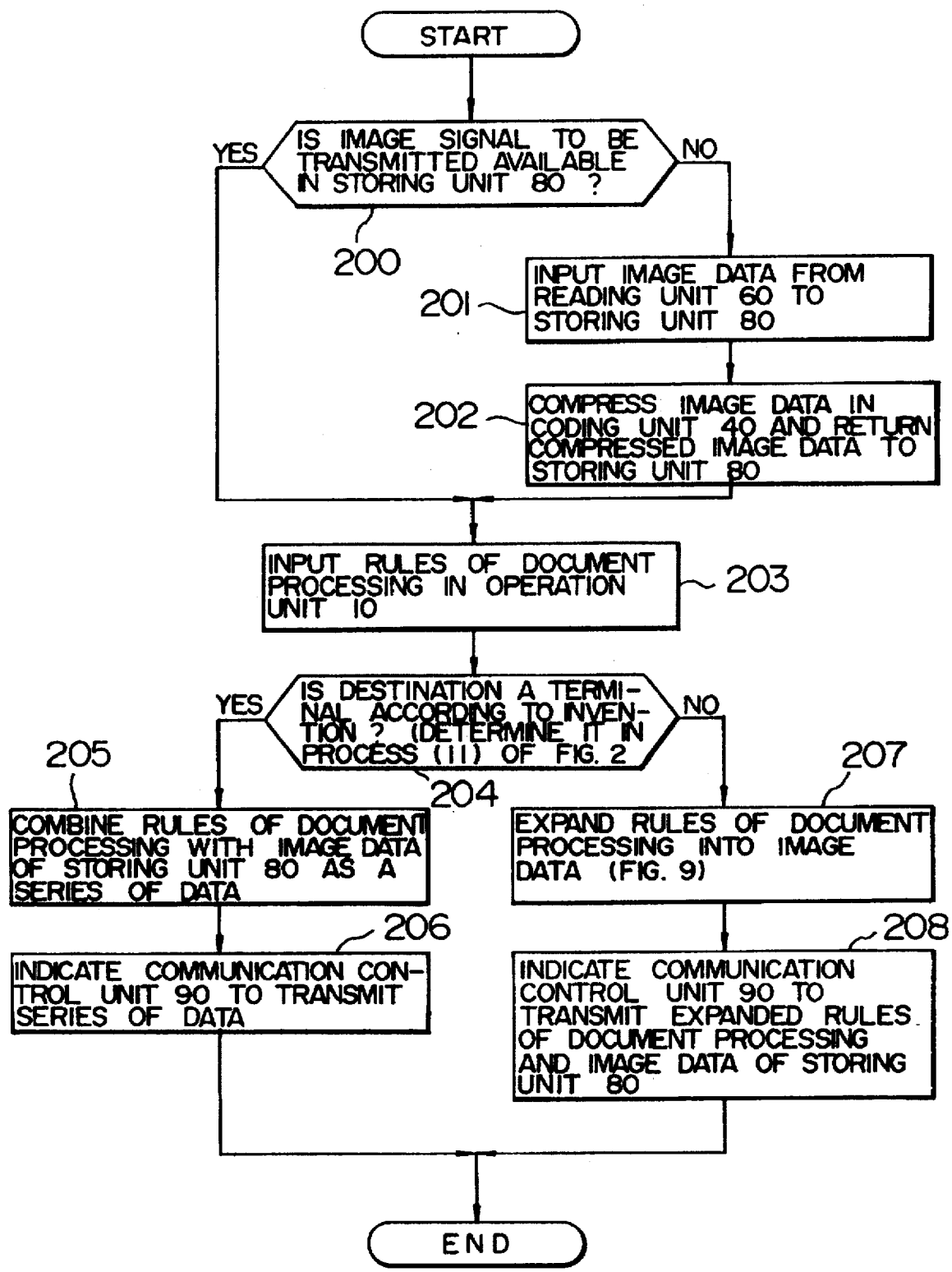
FIG. 10 is a flowchart showing the processing executed when the information processing unit shown in FIG. 8 sends a document.

Next, FIG. 10 shows the protocol to be executed when the information processing unit 30 shown in FIG. 8 transmits a document. In the figure, at the process 200, it is possible to determine whether or not the image signal to be transmitted is stored in the storing unit 80. If the signal is stored, the operation goes to a process 203. If not, at the process 201, the image data is inputted from the reading unit 60 to the storing unit 80. At the process 202, the image data is compressed in the coding unit 40 and then is given back to the storing unit 80. Then, the operation goes to the process 203 at which the rules of document processing are inputted from the operation unit 10.

Next, at the process 204, it is determined whether or not the destination terminal is a document communication apparatus according to the present invention by using the process (11) shown in FIG. 2. If the destination terminal is the document communication apparatus according to the present invention, at the process 205, the rules of document processing and the image data in the storing unit 80 are combined as a series of data. Then, at the process 206, the transmission of the series of data is indicated to the communication control unit 90. Then, the processing of transmitting a document is terminated.

On the other hand, if the destination terminal is not the document processing apparatus according to the present invention, at a process 207, as shown in FIG. 9, the rules of document processing are expanded to the image data. At a process 208, the transmission of the rules of document processing expanded to the image data and the image data stored in the storing unit 80 is indicated to the communication control unit 90. Then, the processing of transmitting the document is terminated.

Figure 11:
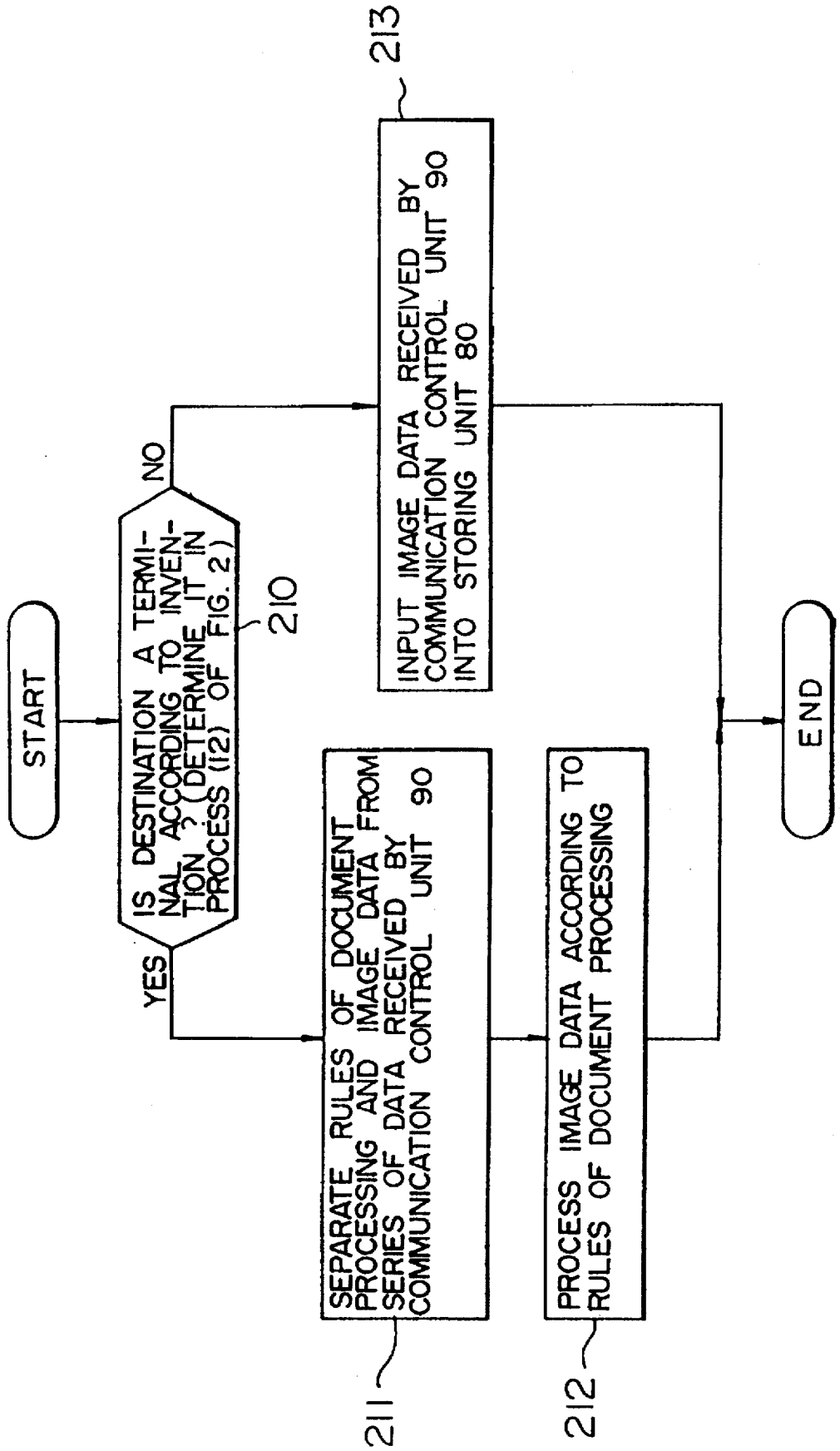
FIG. 11 is a flowchart showing a processing executed when the information processing unit shown in FIG. 8 receives a document.

Next, the procedure of the information processing unit 30 to be executed when receiving a document is shown in FIG. 11. In the figure, at a process 210, it is determined whether or not the destination terminal is the document communication apparatus according to the present invention by using the process (12) shown in FIG. 2. If it is the document communication apparatus according to the present invention, at a process 211, the communication control unit 90 operates to separate the received series of data into the rules of document processing and the image data. At a process 112, the image data is processed according to the rules of document processing. Then, the process of receiving a document is terminated.

On the other hand, if the destination is not the document communication apparatus according to the present invention, at a process 213, the communication control unit 90 operates to input the received image data into the storing unit 80. Then, the process of receiving a document is terminated.

Figure 12:
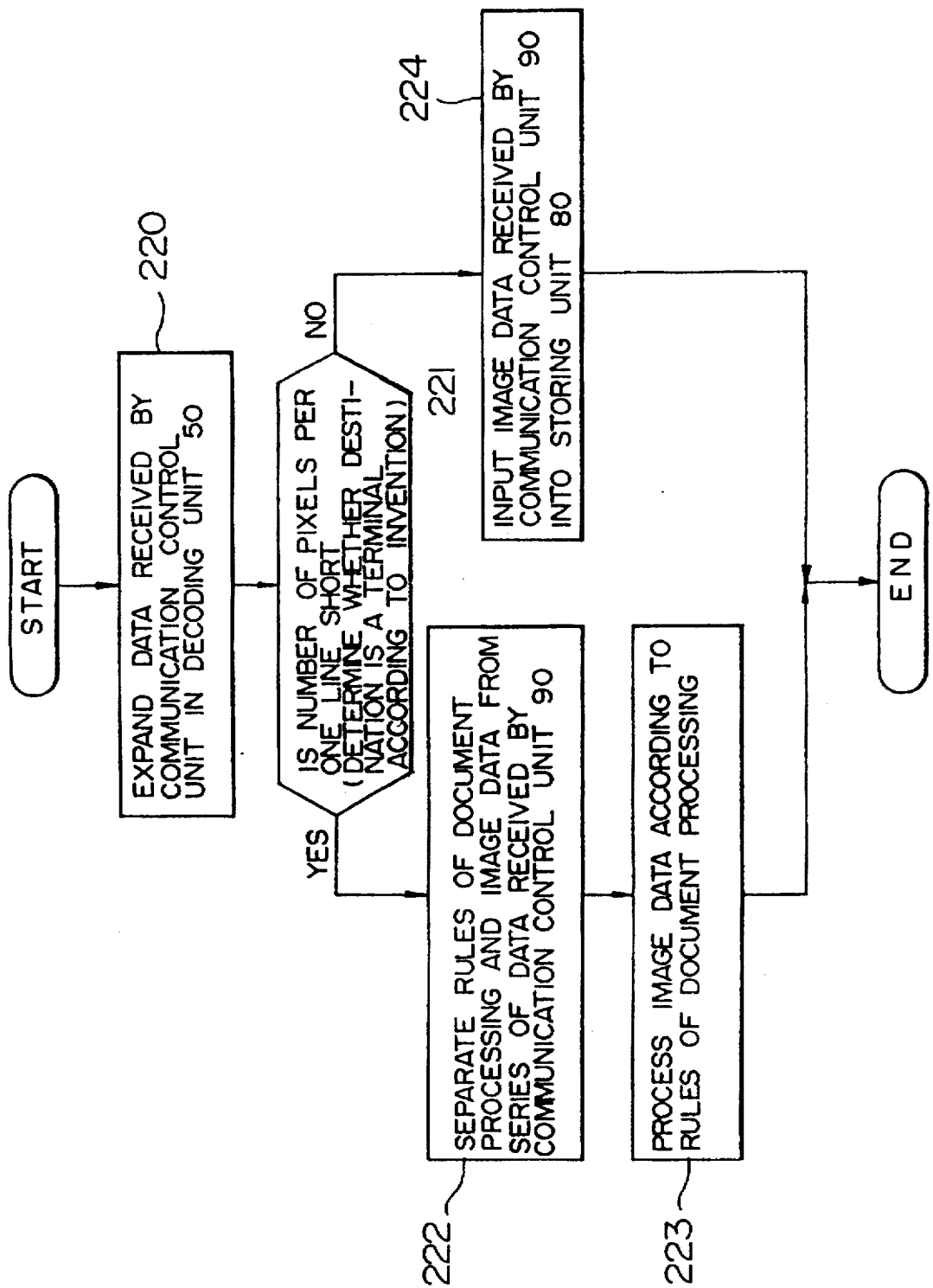
FIG. 12 is a flowchart showing another example of processing by the information processing unit shown in FIG. 8.

FIG. 12 is a flowchart showing a procedure of the information processing unit 30 to be executed when receiving a document. In particular, the shown procedure concerns the case where the transmitting side document communication apparatus adds the information for determining whether or not the rules of document processing shown in FIG. 4 to the series of data. In the figure, at a process 220, the data received in the communication control unit 90 is expanded in the decoding unit 50. Then, at a process 221, it is determined whether or not the destination terminal is the document communication apparatus according to the present invention based on whether or not the number of pixels per one line of the decoded image is shorter than 1728 pixels often used in a facsimile, for example. If the destination terminal is the document communication apparatus according to the present invention, at a process 222, the communication control unit 90 operates to separate the received series of data into the rules of document processing and the image data. At a process 223, the image data is processed according to the rules of document processing. Then, the process of receiving a document is terminated.

On the other hand, if the destination terminal is not the document communication apparatus according to the present invention, at a process 224, the communication control unit 90 operates to input the received image data into the storing unit 80. Then, the process of receiving a document is terminated.

According to the present invention, the transmitting side can specify the procedure to be processed by the receiving terminal as the rules of document processing for each transmission of a document. Hence, the request of the transmitting terminal can be reflected on the rules of document processing.

Further, according to the present invention, the rules of document processing and the image data can be transmitted in the phase C of one facsimile protocol. Further, when decoding the image data, it is determined whether or not the rules of document processing are provided. Hence, it is advantageous in that without having to change the facsimile communication protocol, a set of the rules of document processing and image data can be transmitted at high speed.

Figure 13:
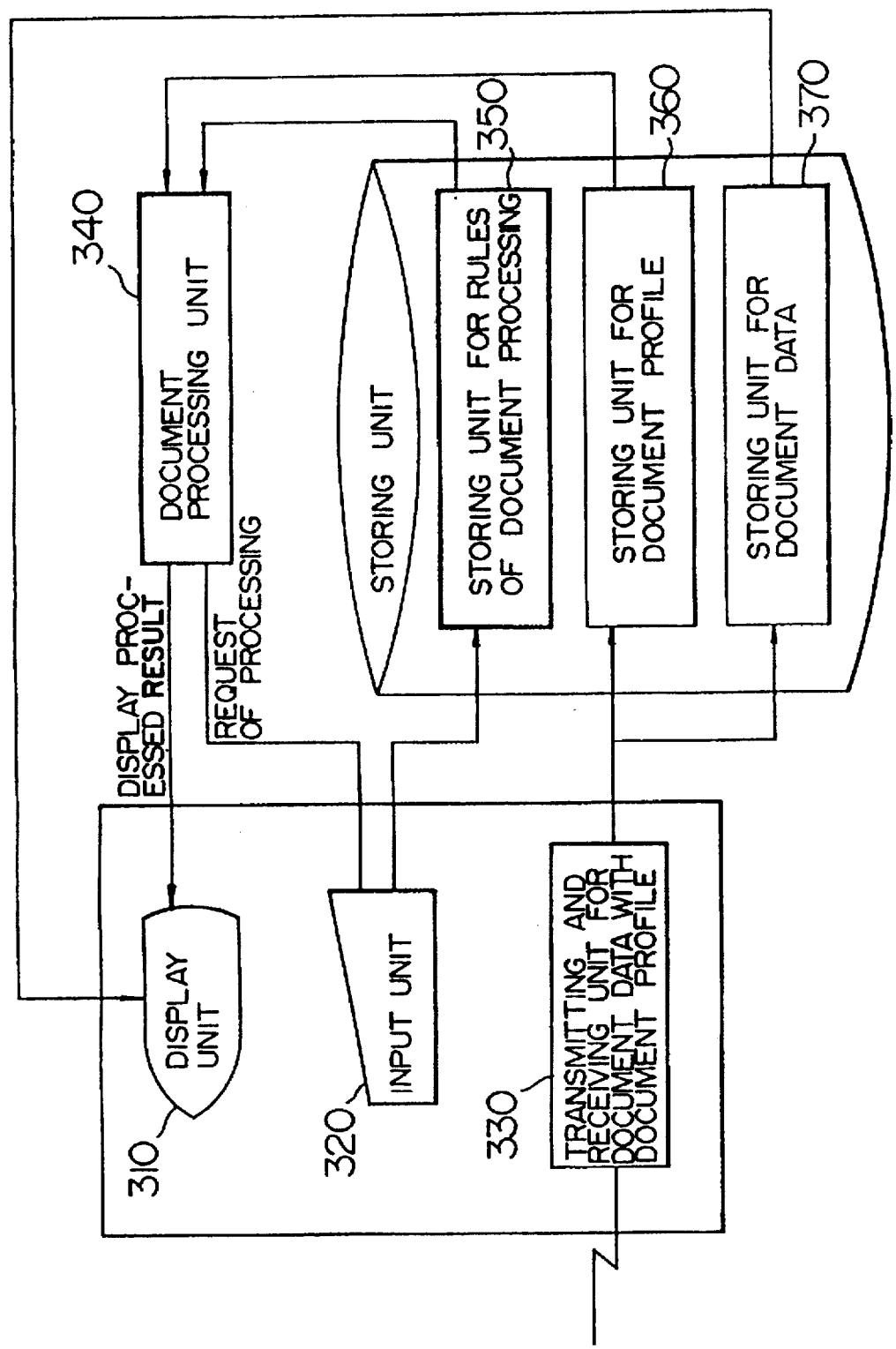
FIG. 13 is a schematic block diagram of a document communication apparatus according to an embodiment of the present invention.

FIG. 13 shows an arrangement of an embodiment of a document communication apparatus having a function of assisting the document processing to be done by an operator on the receiving side.

In the figure, a numeral 310 denotes a display unit. A numeral 320 denotes an input unit. A numeral 330 denotes a transmitting and receiving unit for document data with a document profile. A numeral 340 denotes a document processing unit. A numeral 350 denotes a storing unit for storing the rules of document processing of a receiving station. A numeral 360 denotes a document profile storing unit for storing a profile of a received document. A numeral 370 denotes a document data storing unit.

The display unit 310 operates to display the information required for the user to handle the document communication apparatus and the document data (image data) stored in the document data storing unit 370 and the processed result in the document processing unit 340.

The input unit 320 is a medium for inputting the information required for the operator to operate the communication apparatus, more specifically, to request the document processing unit 340 to process the document or register the rules of document processing in the storing unit 350. The input unit 320 may be a keyboard, a pen base input unit, or a touch panel display.

The transmitting and receiving unit 330 for the document data with a document profile operates to transmit and receive document data having a document profile added as the rules of document processing for a document to be transmitted, such as communication data like a sender's name, document data like a document title, a request for answer, an indication of a deadline, and secrecy.

The document processing unit 340 operates to identify the information stored in the document profile storing unit 360 and execute the document processing based on the information registered in the storing unit 350 for the rules of document processing of the receiving station.

The storing unit 350 operates to register how the received document is processed with a document profile added to the received document as a keyword or the request for processing a document given by an operator of the receiving station.

The document profile storing unit 360 is used for storing the document profile added to the received document. The document data storing unit 370 stores the received document data (image data). When the transmitting and receiving unit 330 receives a document, the document data (image data) is stored in the document data storing unit 370 and the document profile is stored in the document profile storing unit 360.

Figure 14:
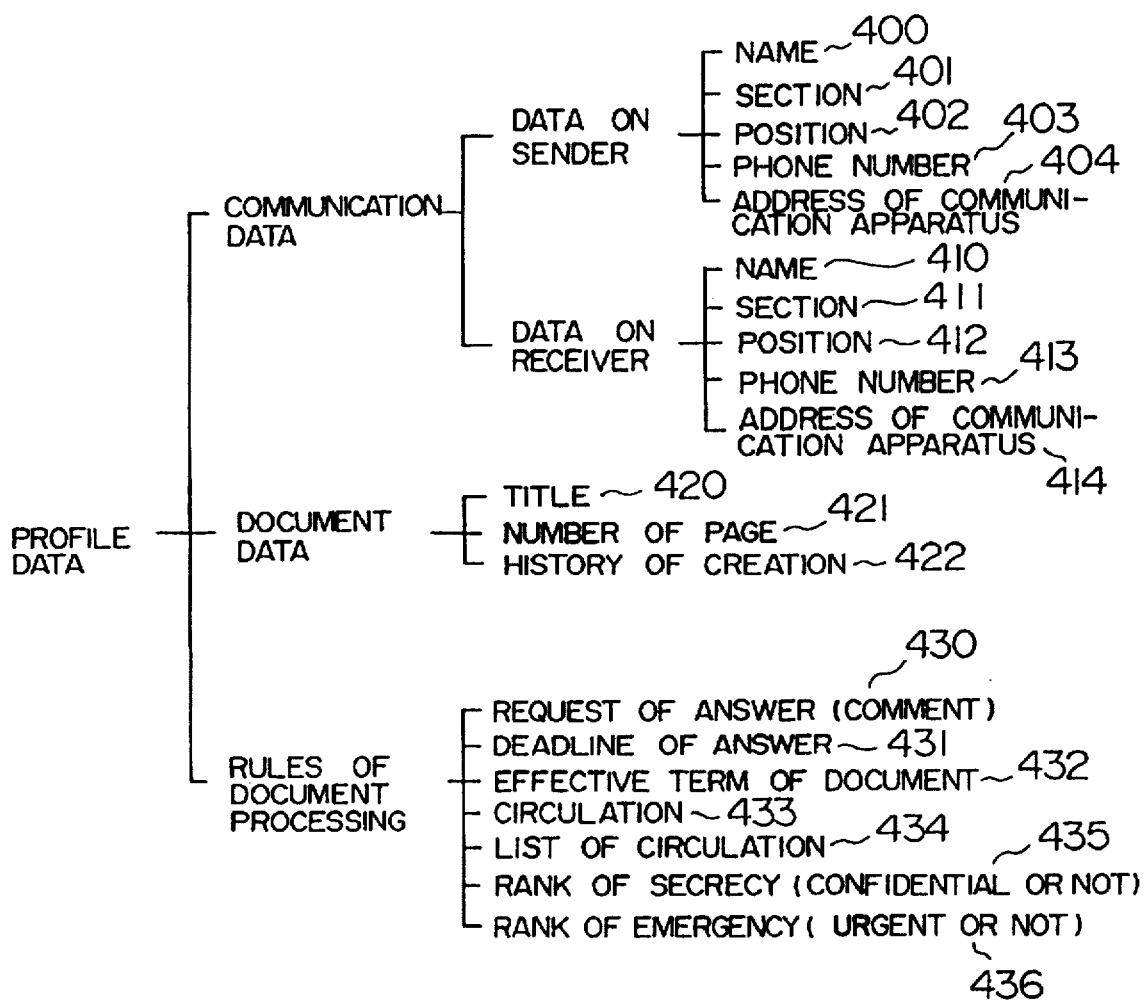
FIG. 14 is diagram showing a type of document profile.

FIG. 14 shows an arrangement of a profile to be transmitted or received in the transmitting and receiving unit 330 for the document data with its document profile.

In the figure, numerals 400 to 436 denote profile types. Sender's information such as a name 400, a section 401 to which he or she belongs, a position 402, a phone number 403, and an address 404 of a communication apparatus is data for identifying the sender. The information 410 to 414 on the receiver are the same as those of the sender in construction and are data for identifying the receiver. A title 420 is used for identifying a case name or a title of document data to be transmitted. A page number 421 indicates a sheet number of a document to be transmitted. A creating history 422 is used for identifying a history of a document to be transmitted such as a day, month and year when creating or changing the document. An answer (comment) request 430 for the rules of document processing is for identifying whether or not the document needs an answer. An answer deadline 431 is a deadline of a document with a request for an answer. An effective term 432 of a document is used for identifying how long the document data like a transmitted catalogue is effective. A circulation 433 is for identifying whether or not the transmitted document is a document to be circulated. About the document to be circulated, a circulating list 434 is used for identifying a user to which a document is to be circulated or a user which has already read the document. A rank Of secrecy 435 is for identifying whether or not the transmitted document is to be handled as a classified document. A rank of emergency 436 is used for identifying whether or not the transmitted document is urgent.

Figure 15:
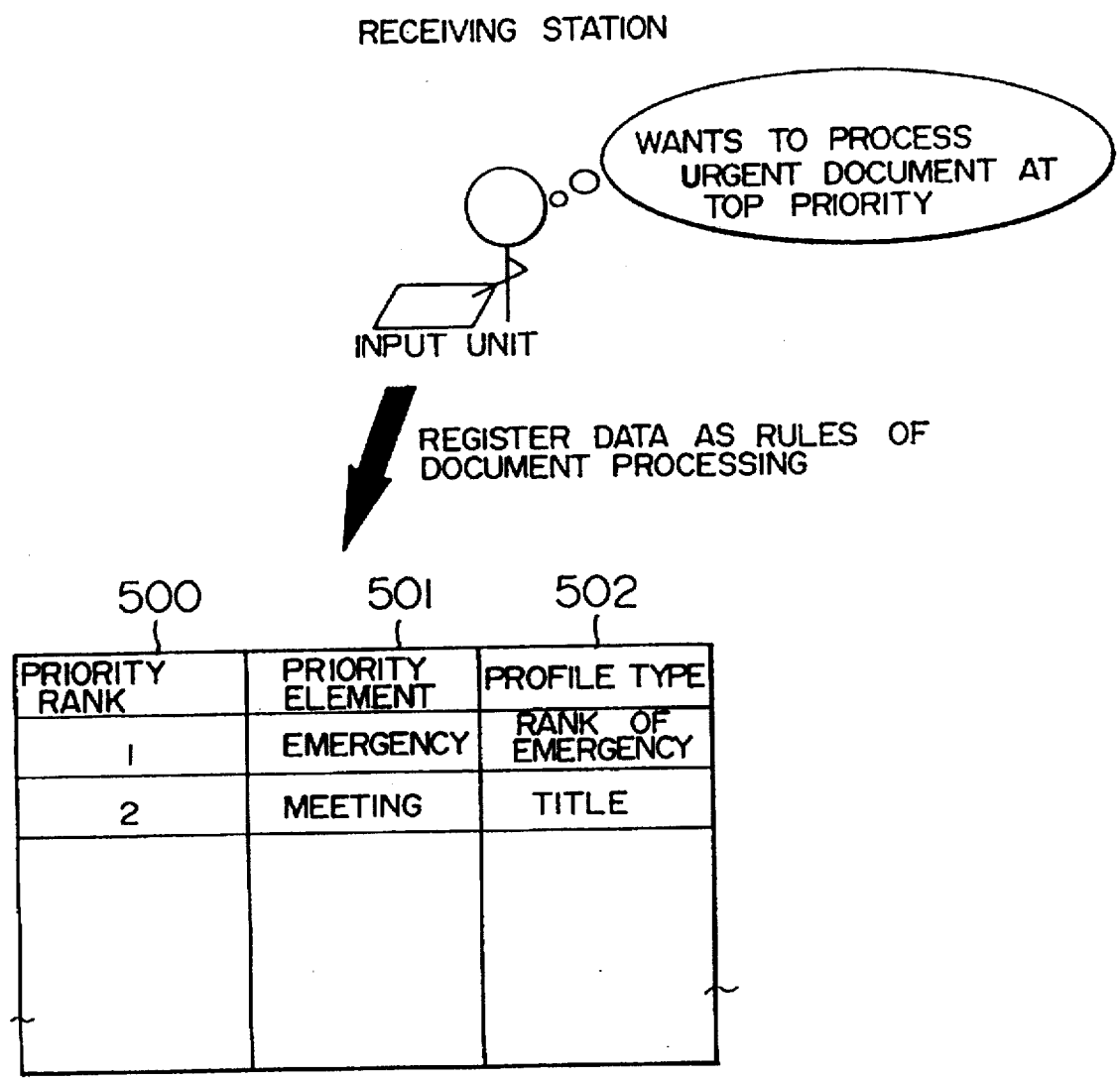
FIG. 15 is a diagram showing an example of rules of document processing information in a receiving station.

FIG. 15 shows an example of a content stored in the storing unit 350 for the rules of document processing of the receiving station.

The rules of document processing in the receiving station is required for ah operator of the receiving station to efficiently process a great deal Of document data stored in the document data storing unit 370. As a storing medium, a fixed memory like a harddisk may be used. In addition, a portable medium like a memory card, an magneto-optical disk, or an optical disk may be used as well. FIG. 15 shows an example in which the processing request for allocating a priority rank to each received document for executing the document processing is registered as the rules of document processing in the storing unit for the rules of document processing. As a content to be registered, a table format as shown in the figure may be available which has various elements, such as a priority rank 500, a priority element 501, and a profile type 502. As the simplest method for allocating a priority rank, the days left until a deadline are calculated from the deadline for the answer indicated in the document profile and a higher priority rank is given to the document whose deadline is closer. Thus, by using the table, the processing method desired by an operator of the receiving station is reflected on the actual document processing. In this embodiment, if the operator of the receiving station "desires to process a document which has been transmitted to be processed urgently, taking procedure over the others", by handling the input unit 320 shown in FIG. 13, the priority level is registered in the item of the priority rank 500 (for example, if the top priority level is assumed as "1", a value of "1" is registered in this column), "emergency" is registered in the priority element 501, and "rank of emergency" is registered in the profile type 502. Herein, the profile type 502 is used for identifying an item of the document profile to which the registered element belongs. The registered data is stored as the rules of document processing in the storing unit 350 for the rules of document processing of the receiving station.

Figure 16:
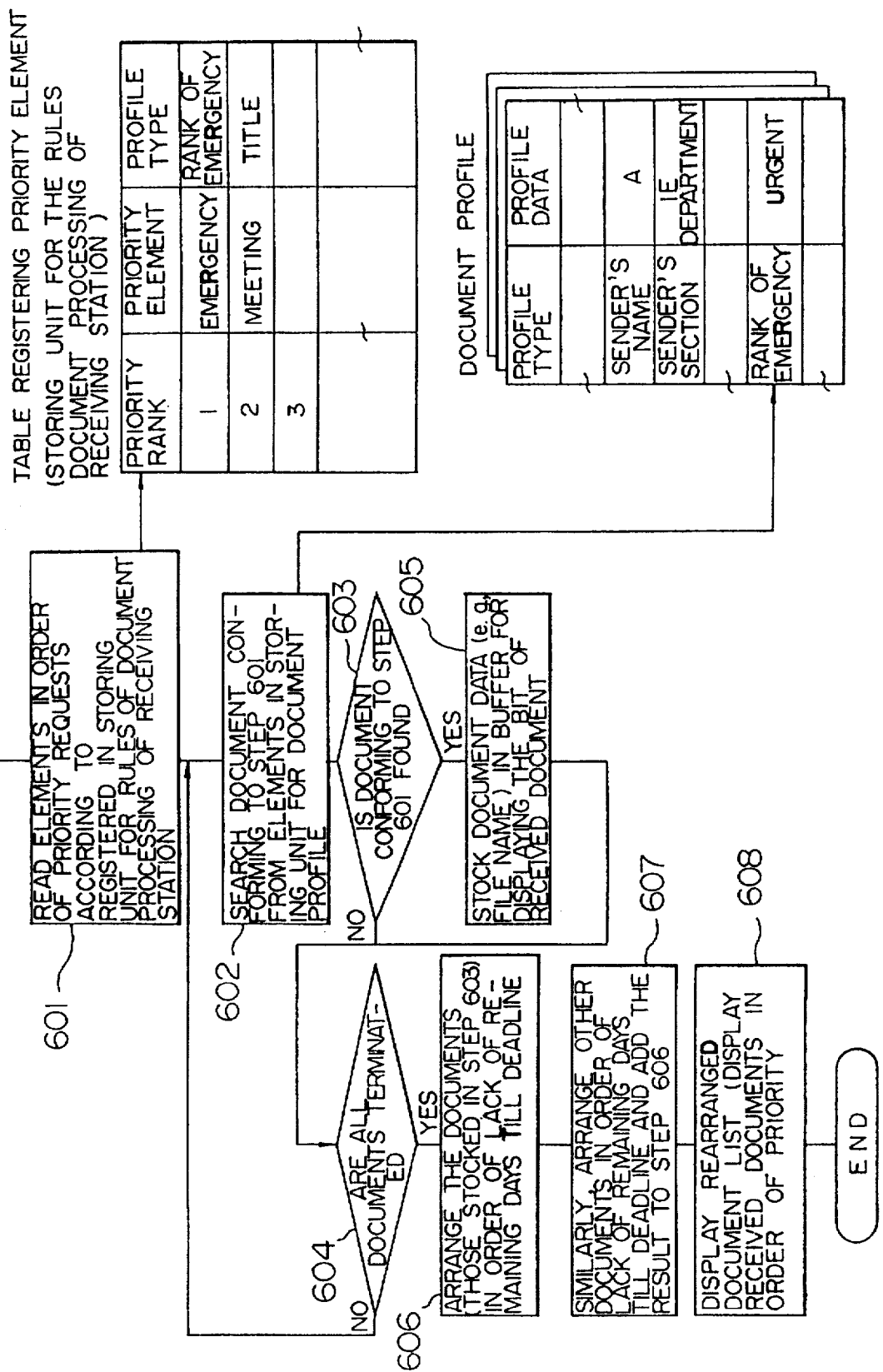
FIG. 16 is a flowchart showing an example of document processing in a receiving station.

FIG. 16 is a flowchart showing a method for identifying each document profile based on the rules of document processing of a receiving station and displaying the received documents according to priority in the document processing unit 340. In the figure, when an operator handles the input unit 320 and requests display of the received documents according to priority, at first, registered data is sequentially read from the storing unit 350 for the rules of document processing of the receiving station in the order of requested priority (step 601). Next, the operation is executed to find the document corresponding to the step 601 from the storing unit 36 in the storing unit 360 for the document profile (steps 602, 603). If the document of concern is found, information on the document (for example, a file name) is stored in a buffer for displaying a list of the received documents (step 605). This process is repetitively executed for all the received documents (step 604). Then, the resultant documents (documents stacked at the step 603) are rearranged in the order of urgency, that is, in the order of remaining days left till the deadline (step 606). The other documents also are rearranged in the order of remaining days left till deadline and then the rearranged documents are added to the content rearranged at the step 606 (step 607). The list of the overall rearranged documents is displayed in the display unit 1 (step 608). The information registered in the storing unit 350 for the rules of document processing of the receiving station, referred at the step 601 (table having a priority element registered therein), may be automatically updated by learning the sequence of the operator's document processing.

Many methods are available for allocating priority for processings to each received document. Herein, one of these methods has been described.

Figure 17:
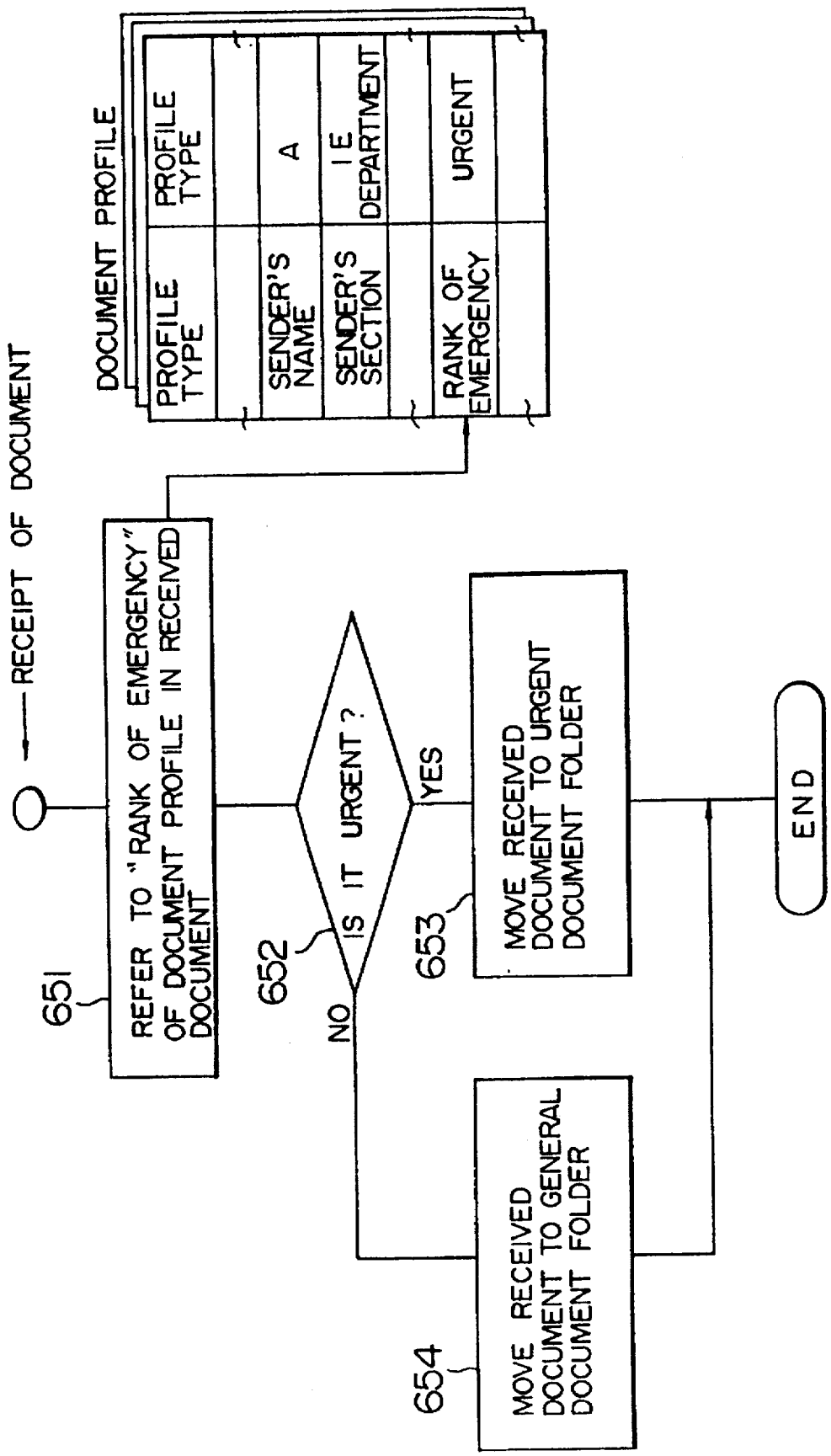
FIG. 17 is a flowchart showing another example of document processing in a receiving station.

FIG. 17 is a flowchart showing how the received documents are sorted based on the sent document profile. The flowchart shows a method for automatically determining whether or not the received document is to be urgently processed on the document profile added to the received document and then sorting the received documents in the predetermined folders. In the figure, when the receiving station has received a document, at first, the station refers to the profile type "rank of emergency" of the document profile of the received document (step 651).

If the received document contains data (profile data) accompanied with the profile type "rank of emergency" is "urgent", the received document is moved to the urgent document folder and the other received documents are moved to a general document folder (steps 652 to 654).

Figure 18:
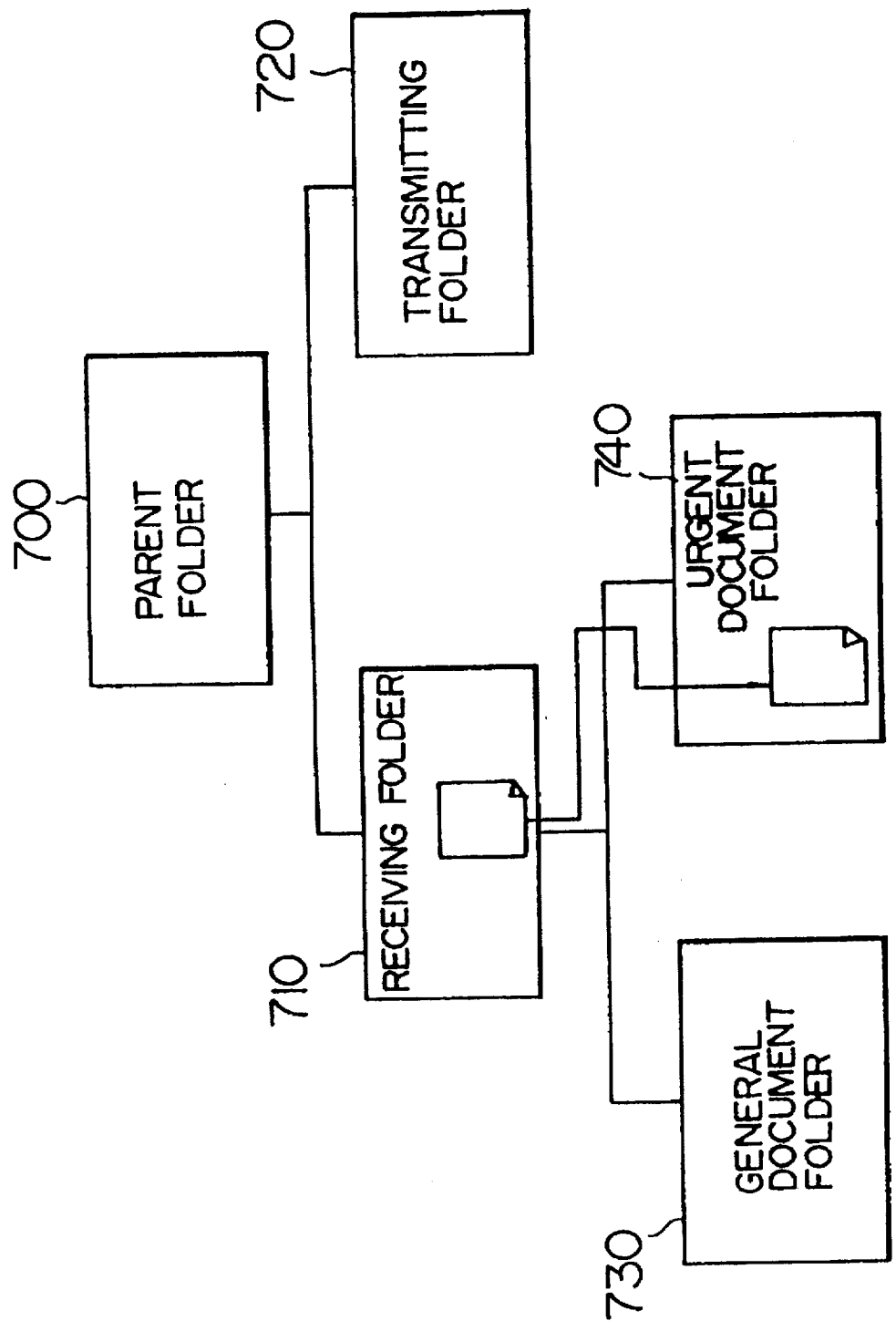
FIG. 18 is a diagram showing an example of document management in a document data storage unit.

FIG. 18 is auxiliary to FIG. 17 and shows an example of document management in the document data storing unit 370 of the receiving station. The document data storing unit 370 includes a hierarchical structure as shown in FIG. 18. Once the received document is stored in the receiving folder 710, the processes at the steps 651 to 6S4 in the flowchart of FIG. 17 are executed to manage the received document as data in an urgent document folder 740 or a general document folder 730. Each folder corresponds to a group name of the sorted documents.

Figure 19:
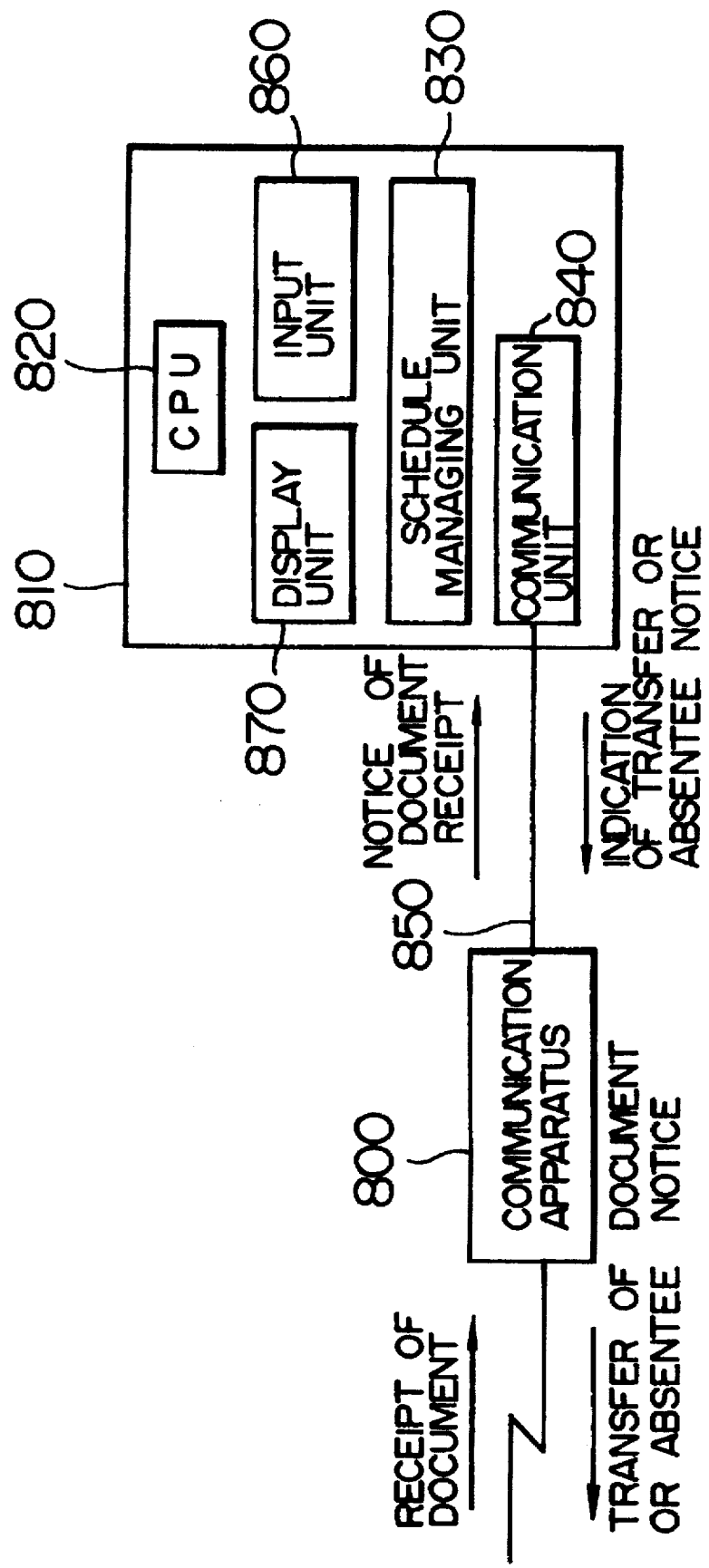
FIG. 19 is a block diagram showing an arrangement of a secretary system arranged to combine a schedule managing function of an operator of a receiving station with the present document communication apparatus.

Next, the description will be directed to a system to which the communication apparatus according to the present invention applies. FIG. 19 shows an embodiment of the system, which is directed to a secretary system having a function of managing an operator's schedule. In FIG. 19, the communication apparatus 800 is the apparatus according to the present invention.

A schedule managing apparatus 810 includes at least a CPU 820, a schedule managing unit 830, a communication unit 840, an input unit 860, and a display unit 870 loaded thereon. It may be realized by a personal computer. A communication path 850 is a medium for connecting the communication apparatus 800 with the schedule managing apparatus 810 for transferring document data or control commands therebetween.

When the communication apparatus 800 receives a document, receipt of the document is indicated to the schedule managing unit 830 through the communication path 850 and a communication unit 840 of the schedule managing apparatus 810. The schedule managing unit 830 stores an operator's schedule and indicates to the display unit 870 that the document is received if an operator is present in the right location or comes to the office by referring to the schedule information. With this function, the operator comes to know of the receipt of a document.

If the operator is absent, the schedule managing apparatus 830 notifies the communication apparatus 800 of a document transfer or an absentee notice. The communication apparatus 800 operates to process the received document according to the indication of the schedule managing apparatus 830.

The input unit 320 and the display unit 330 described in FIG. 13 may be replaced with the input unit 860 and the display unit 870 of the schedule managing apparatus (personal computer) by using the communication path 850. Further, the schedule managing unit 830 may be provided as an extended function of the communication apparatus. Conversely, the function of the communication apparatus 800 may be provided as an extended function of the schedule managing apparatus 810.

Figure 20:
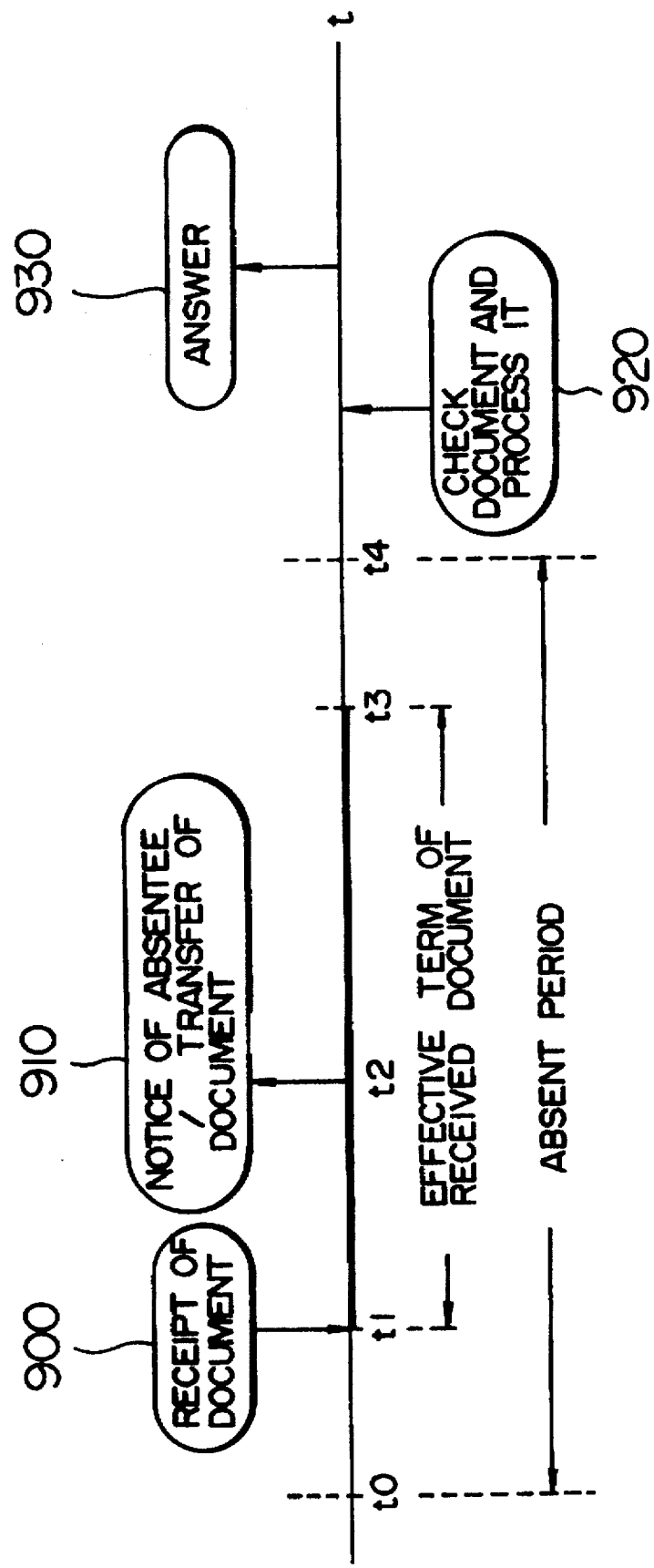
FIG. 20 is a diagram showing a function of the secretary system shown in FIG. 19.

FIG. 20 is an explanatory view showing the function of the secretary system as shown in FIG. 19.

In FIG. 20, the abscissa denotes a time (t). While the operator is absent (t0 to t4), the system receives a document at a time t1 (900). If it is determined that the deadline of the answer is specified to some time point during the period of absence of the operator, by referring to the deadline of the document profile (effective term of the received document) and the schedule information added to the received document, the absentee notice or the document transfer is executed at a time t2 (910).

If the function of the document communication apparatus according to the present invention is not provided in this system, the operator processes by himself or herself the document whose deadline is expired (920) and sends an answer with a statement of apology (930). The function provided in this system has an advantage that the operator dispenses with some works (corresponding to the steps 920 to 930) about the document whose deadline is expired after the duration of absence of the operator.

According to the present invention, when the received document is processed, the received document is identified based on the document profile transmitted with the document itself and the rules of document processing of the receiving station and then is processed. Hence, the operator of the receiving station does not need to make sure of each of a pile of transmitted documents one by one. According to the indication of this apparatus, the document processing can be smoothly executed.

What is claimed is:

1. A document communication apparatus comprising:
   input means for providing a a plurality of rules of document processing, each of which indicate a manner of document processing at another document communication apparatus;
   communicating means for transmitting document information and a plurality of rules of document processing in an order in which said rules of document processing are to be executed at another document communication apparatus or for receiving document information and a plurality of rules of document processing transmitted from another document communication apparatus in an order in which the rules of document processing are to be executed; and
   information processing means for processing received document information by executing said plurality of rules of document processing in an order received from said communicating means.

2. A document communication apparatus as claimed in claim 1, wherein said plurality of rules of document processing received from said communicating means include a rule for document sorting, and said information processing means executes sorting of document information according to a procedure indicated by said rule for document sorting.

3. A document communication apparatus as claimed in claim 1, wherein said plurality of rules of document processing received from said communicating means include a rule for returning an answer that indicates that the document was opened, and said information processing means operates to transmit said answer that shows that the document was opened according to a procedure indicated by said rule for returning an answer that shows that the document was opened.

4. A document communication apparatus as claimed in claim 1, wherein said plurality of rules of document processing received from said communicating means include a rule for returning comments, and said information processing means transmits document information with comments according to the procedure indicated by said rule for returning comments.

5. A document communication apparatus as claimed in claim 1, wherein said plurality of rules of document processing received from said communicating means include a rule for circulating documents, and said information processing means operates to transmit document information with comments to another document communication apparatus to which said document is to be circulated according to a procedure indicated by said rule for circulating documents.

6. A document communication apparatus as claimed in claim 1, wherein said information processing means indicates to said communicating means that code data of said plurality of rules of document processing is to be transmitted as FAX image data.

7. A document communication apparatus as claimed in claim 6, wherein said information processing means receives FAX image data, decodes said received FAX image data as the rules of document processing and determines whether or not said rules of document processing are to be added to image data base on a result of the decoding.

8. A document communication apparatus as claimed in claim 1, wherein said processing means determines whether or not a destination communication apparatus is capable of receiving said rules of document processing in the form of code data, and if said destination communication apparatus is not capable of receiving said rules of document processing in the form of code data, said information processing means controls said communicating means to cause said rules of document processing in code data form to be expanded to image information and said image information is transmitted by said communicating means as document information.

9. A document communication apparatus as claimed in claim 1, wherein said plurality of rules of document processing include at least two rules selected by said input means from the group consisting of a rule for document sorting, a rule for returning an answer that indicates that the document was opened, a rule for returning comments and a rule for circulating documents among communication apparatus.

10. A document communication system arranged to transmit and receive information among plural stations, each of said stations operating as a document communication station for transmitting or receiving a document having a plurality of first rules of document processing added thereto, the content of said first rules of document processing specifying a process for document processing of the appended document, comprising:
   means for storing in a receiving station a document profile, including a plurality of first rules of document processing, in an order specified from a transmitting station from which a document is received;
   means for storing in said receiving station a plurality of second rules of document processing, in an order specified in said receiving station;

means for correlating said first rules of document processing in said document profile, read from said means for storing a document profile, with said second rules of document processing, read from said means for storing second rules of document processing, to produce processing rules;

document processing executing means for performing predetermined document processing by executing the processing rules;

means for storing document data transmitted from said transmitting station;

input means for inputting a document processing profile of said receiving station; and display means for displaying said document data, said document profile, said second rules of document processing of said receiving station, and a result of said document processing.

11. A document communication apparatus as claimed in claim 10, wherein said document processing executing means allocates a priority processing sequence of document processing in said receiving station to each received document.

12. A document communication apparatus as claimed in claim 10, wherein said document processing executing means sorts the received documents based on the transmitted document profile and the second rules of document processing of said receiving station.

13. A document communication system comprising:

a document communication apparatus as claimed in claim 10; and means for managing a schedule of an operator of said receiving station.

* * * * *